Figure 1:
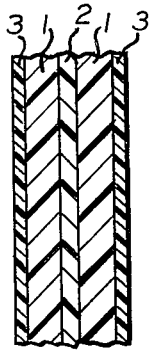

United States Patent [19]

Knackstedt et al.

[11] 3,916,074

[45] Oct. 28, 1975

[54] MAKING LAMINATED SAFETY GLASSES INCLUDING LAYERS OF AMORPHOUS POLYAMIDES

[75] Inventors: Wilhelm Knackstedt, Troisdorf; Rolf Beckmann, Siegburg, both of Germany

[73] Assignee: Dynamit Nobel AG, Troisdorf, Germany

[22] Filed: Aug. 3, 1973

[21] Appl. No.: 385,377

Related U.S. Application Data

[63] Continuation of Ser. No. 178,989, Sept. 9, 1971, abandoned.

[52] U.S. Cl. .............. 428/425; 156/99; 156/106; 156/278; 428/435; 428/437; 428/474; 428/520
[51] Int. Cl.² .............. B32B 17/10; B32B 31/12
[58] Field of Search ............ 156/99, 102, 106, 278; 117/64 R, 65.2; 161/190, 197, 199, 227

[56] References Cited
UNITED STATES PATENTS

| | | | |
|---|---|---|---|
| 2,320,536 | 6/1943 | Pollack | 117/64 R |
| 2,444,492 | 7/1948 | Blout et al. | 156/99 |
| 2,481,809 | 9/1949 | Barnes | 117/64 R |
| 2,589,567 | 3/1952 | Nickerson | 117/64 R |
| 3,081,192 | 3/1963 | Idelson | 117/64 R |
| 3,515,579 | 6/1970 | Shepherd et al. | 117/124 |
| 3,658,636 | 4/1972 | Beckmann et al. | 161/199 |

*Primary Examiner*—Daniel J. Fritsch
*Attorney, Agent, or Firm*—Burgess, Dinklage & Sprung

[57] ABSTRACT

In the production of laminated glass including an amorphous polyamide layer bonded to another layer, the improvement which comprises covering the polyamide layer with a lacquer resulting from addition or condensation of reactive materials, e.g. a hydroxy-containing polyester or acrylate resin cross-linked with melamine or a polyisocyanate.

6 Claims, 11 Drawing Figures

U.S. Patent  Oct. 28, 1975  3,916,074

INVENTORS
WILHELM KNACKSTEDT
ROLF BECKMANN
BY
BURGESS, DINKLAGE, & SPRUNG
ATTORNEYS.

MAKING LAMINATED SAFETY GLASSES INCLUDING LAYERS OF AMORPHOUS POLYAMIDES

This is a continuation, of application Ser. No. 178,989 filed Sept. 9, 1971, now abandoned.

The present invention relates to the production of laminated safety glasses including layers of amorphous polyamides.

In the production of laminated safety or bullet-proof glasses utilizing binding layers of plasticizer containing polyvinyl butyral it is known to use cover sheets of amorphous polyamides, the amides having viscosities of about 90 to 160 and being made from terephthalic acid and possibly isophthalic acid or their esters and hexamethylene diamines, or of adipic acid, hexamethylene diamines, p,p'-diamino-dicyclohexyl methane and caprolactam, the like, as protection for the various layers, e.g. French Pat. No. 1,559,208, German Pat. No. 1,596,781 and U.S. Pat. No. 3,150,117. The amorphous polyamide foils or sheets used for laminated safety glasses are produced from granulate by extrusion in the desired width and cutting the continuous extrudate to any length desired. These blank foils are then pressed between plane parallel plates in known manner to achieve an optically perfect surface. In practice, however, these products often do not meet the very high performance demands made on them, e.g. relative to scratch resistance and moisture resistance.

It is accordingly an object of the present invention to provide laminated safety glasses which avoid these disadvantages and are characterized by high resistance to scratching and moisture.

These and other objects and advantages are realized in accordance with the present invention pursuant to which polyamide sheets are again used in conjunction with plasticizer-containing polyvinyl butyral binder used to bind the glass layers. Prior to pressing the structure between parallel planar plates, the polyamide layers are covered on one or both sides with a light-stable, tenaciously adherent lacquer which may be set by addition or condensation after application.

Upon the subsequent pressing between plane parallel plates, the amorphous polyamide when heated becomes viscoelastic and, upon cooling together with the lacquer coating, takes on the surface quality of the pressure plates. Surprisingly, this pressing process is possible despite use of even very hard lacquer coatings so that with a proper choice of the pressure plates, surfaces of the highest optical quality can be achieved which afford absolutely refraction- and deflection-free visibility. When pressing material coated with soft lacquers, the pressing conditions are selected in such a way that only the lacquer coat reaches the plastic state and on one face takes on the surface of the carrier material of amorphous polyamide and on the other face the surface of the pressing plates used. Since lacquers are used having a refractive index very close to that of the amorphous polyamide, laminated safety glasses or bullet-proof glasses of the highest optical quality can be produced in this case as well.

The lacquer coatings also serve to prevent diffusion of moisture through the amorphous polyamides to the softened polyvinyl butyral layers. As is known, the adhesion of these polyvinyl butyral layers to silicate glass decreases with an increasing moisture content. The same holds true for the adhesion to the amorphous polyamides. Therefore, it is desirable to maintain a moisture content in the adhesive layer of about 0.05 to 0.5% over the full life of the laminated panes. To this end it is also desirable to lacquer the sides of the finished laminates, even though it is not normally necessary there to have a particularly effective scratch resistance.

Lacquers suited for use according to the invention include, for example, addition products (polyurethanes) of aliphatic isocyanates with compounds that possess labile hydrogen atoms. Such compounds may, for example, be strongly branched polyesters with a high content of free hydroxyl groups or isocyanate-extended linear polyesters with free hydroxyl groups for soft lacquers. Of special advantage is the use of polyfunctional aliphatic isocyanates of low volatility, e.g. a reaction product with biuret structure of 3 moles of hexamethylene diisocyanate and 1 mole of water. A further improvement in surface hardness without appreciable loss of light stability can be achieved by a proportional additional use of an isocyanurate of three moles of toluylene diisocyanate with 2 moles of hexamethylene diisocyanate; see thereto Farbe und Lack, 1969, Pages 318–326 and Sonderdruck (special publication) of Farbenfabriken Bayer relative to a lecture at the 1962 Fatipec convention in Wiesbaden, Pages 31–34. Also suited are, for example, lacquers based on polyfunctional acrylate resins with free hydroxyl groups that can be cross-linked, e.g., with melamine resins or polyisocyanates. These resins combined the desirable properties of thermoplastic acrylic esters such as stability to light and good adhesion, with the desirable hardness of thermosetting resins achieved by cross linking through polycondensation or polyaddition (See Rauch-Puntigam/Volker, Chemie Physik und Technologie der Kunststoffe in Einzeldarstellungen, Volume 9, "Acryl und Methacrylverbindungen Springer Verlag 1967").

Despite the good light stability of such lacquers based on polyfunctional acrylate resins cross-linked with melamine resins, it may under certain conditions be advisable to add known light-stabilizing agents such as benzophenones or benzotriazoles or substitution products thereof and acrylonitrile substitution products having an ethylene double bond conjugated with respect to the cyanogen group. Typical compounds are e.g. 2,4-dihydroxybenzophenone, 2,2'-dihydroxy-4-methoxybenzophenone, 2-(2'-hydroxy-5'-methylphenyl)benztriazole, α-cyanogen-methyl-4-methoxycinnamic acid methyl ester, and the like. Because of the chemical reactivity of some of these light-stabilizing agents, for stabilization of polyurethane lacquers it is preferable to use acrylonitrile substitution products. While it is known to coat polyamides in the form of finished structures with some lacquers partially of the type herein mentioned (see Veiweg/Muller, Kunststoffhandbuch "Polyamide" Volume VI, 1966, P. 425) no suggestions are made with regard to use in laminated glass according to the present invention. This is particularly true for the reason that a subsequent lacquering of the polyamide layers pressed between plane parallel plates does not ensure absolutely refraction- and deflection-free visibility.

The forementioned lacquers are generally quite hard but it is also possible to utilize somewhat softer lacquers to protect the polyamide since impressions in the lacquer recover quickly and do not become visible.

Moreover, the surface is not necessarily destroyed every time it is scratched.

A further advantage of the present invention lies in the fact that the lacquering can be effected continuously. The coating materials, present in form of hardening lacquer solutions, are applied by a suitable lacquering device to an endless blank foil and then set by passage into a drying oven.

Figure 2:
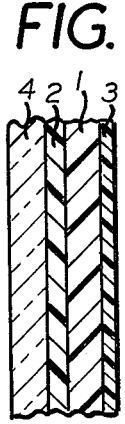
Figure 3:
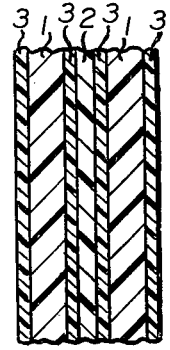
Figure 4:
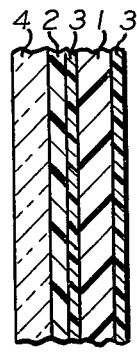
Figure 5:
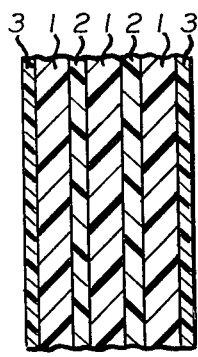
Figure 6:
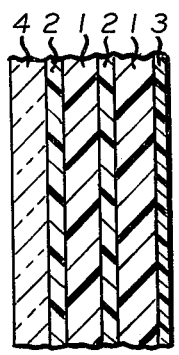
Figure 7:
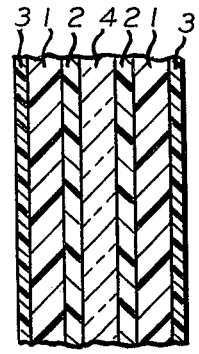
Figure 8:
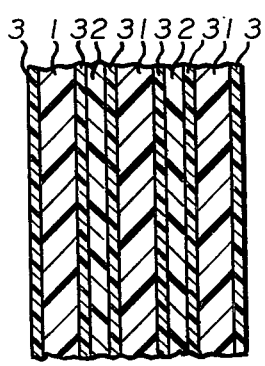
Figure 9:
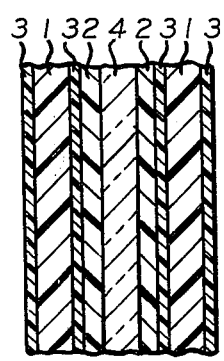
Figure 10:
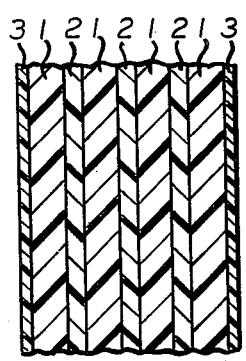
Figure 11:
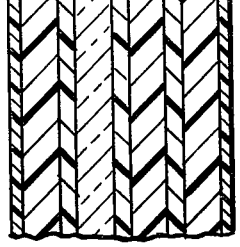

The invention will be further described with reference to the accompanying drawing, wherein FIGS. 1 to 11 are sectional views through laminated safety glasses made in accordance with the invention.

In the drawing, 1 is a layer of amorphous polyamide, 2 is a sheet of polyvinyl butyral serving as an adhesive, 3 is the lacquer layer protecting the polyamide and 4 is a layer of other material such as a silicate glass. As can be seen in the several figures, the total structures must comprise at least four layers, i.e. a polyamide layer 1 bonded to some other layer (4 or another 1) by an adhesive layer 2 and protected on one or both surfaces by a lacquer layer 3. The lacquer layers may obviously also be interposed between the polyamide and adhesive layers.

The thickness of the scratch-resistant lacquer coatings applied may vary from about 0.04 to 0.5 mm, preferably about 0.1 to 0.3 mm. The thickness of the polyvinyl butyral layers 12 ranges from about 0.4 to 1.5 mm, preferably about 0.7 to 1.2 mm. The thickness of the amorphous polyamide layer (1) depends upon the intended application. For customary laminated safety glass a thickness of about 0.1 to 1 mm preferably about 0.2 to 0.5 mm is suitable; in the case of laminated bulletproof glasses the thicknesses may vary between about 2 and 30 mm and more preferably about 4 mm to 20 mm. When the amorphous polyamide layers is combined with layers of other transparent materials such as silicate glass layers 4, the thickness of the glass layers will also depend upon the intended application and may vary between about 0.5 and 20 mm, preferably about 0.8 to 10 mm.

The invention will be further described in the following illustrative examples.

EXAMPLE 1

Hydroxyl-group containing polyester A a. 1.470 g of trimethylolpropane are heated to 120°C in a reaction vessel provided with stirrer and cooler while introducing an inert gas, viz, nitrogen. While stirring 1.480 g of phthalic acid are added. The vessel is closed. Upon heating to 150°C, distillation sets in. The temperature is maintained at 150°C for 2 hours. Over a period of 3 to 4 hours the temperature is then increased to 200°C and maintained for about 10 hours. When the acid number has dropped to approximately 5, vacuum is applied and the temperature is maintained at 210°C until the acid number has dropped to 2 to 3. Then the contents are cooled and mixed with 1.480 g of ethylene glycol monoethyl ether acetate at about 150°C so that a 65% solution of polyester is obtained. Characteristic numbers of the solid resin: OH-number; 270, accordingly the OH-equivalent weight is 210 or the OH-content 8%. The viscosity of the 65% solution is approximately 900 centipoise at 20°C.

b. 74 Parts by weight of the solution resulting in (a) — containing 48 parts by weight of polyester — are mixed with 52 parts of the reaction product of 3 moles of hexamethylenediisocyanate and 1 mole of water, such reaction product having a biuret structure and 3 free isocynate groups per molecule. The resulting solution is adjusted to 50% solids by weight by addition of methyl ethyl ketone and cyclohexanone to bring the solvent composition by weight to 36-50-14 ethylene glycol monoethyl etheracetate-methyl ethyl ketone-cyclohexanone. The solution is applied to an extruded blank foil of an amorphous polyamide and baked 20 minutes at 120°C. The foil carrying a lacquer coating 0.12 mm thick is then pressed between plane parellel plates. There results an optically satisfactory foil for the particular purpose intended. The same lacquer is similarly suited for sealing the edges of laminated glass, thereby preventing the penetration of moisture into the laterally exposed softened polyvinyl butyral. Such penetrating moisture may lead to delamination caused by a reduced adhesion of the polyvinyl butyral foil.

EXAMPLE 2

Polyacrylate resin a. 350 g of xylene are heated to 105° to 110°C in a heatable reaction vessel provided with stirrer and reflux condenser. Over a period of 2 hours a solution consisting of 153 g of methyl acrylate, 153 g of styrene, 67.5 g of ethyl acrylate, 76.5 g of hydroxypropyl methacrylate and 6.75 g of benzoyl peroxide in 100 g of butyl acetate are fed into the reaction vessel while introducing nitrogen and stirring. 0.45 g of benzoyl peroxide are added after 3 hours and again after 5 hours. After about 10 hours the mixed polymerization is completed. The 50% solution in butyl acetate xylene has a viscosity of 800 centipoise at 20°C.

Melamine resin b. 857 g of 30% neutral aqueous formaldehyde solution, 1.5 g of 10% caustic soda, 444 g of butanol and 44 g of toluene are placed into a reaction vessel equipped with stirrer and cooler for azeotropic water separation. While stirring at 95°–100°C, 607 g of water are distilled off under recycle conditions over a period of 12 hours. Thereupon 1.7 of 2N formic acid are added for the etherification with butanol and the azeotropic distillation is continued. After another 4 hours about 110 g of water have again separated. As soon as 5 g of the resin solution are compatible with 25 ml of gasoline (boiling range 130° to 200°), the etherification has gone far enough and is discontinued. Thereupon the vessel is cooled to 60°–70°C. and about 275 g of solvent are distilled off in a vacuum (30 mm Hg) until the solution contains 70% of solids.

c. On a polyamide blank foil, using a 50% by weight solution in a solvent mixture of butyl acetate, xylene and methyl ethyl ketone (58-27-21 by weight), there was applied a lacquer film of 70 parts by weight of the polyfunctional, hydroxy-containing acrylate resin produced in (a) and 30 parts by weight of the partially etherified melamine resin produced in (b). After baking at 135°C for 30 minutes the lacquer thickness was 0.08 mm and, after subsequent pressing, an optically satisfactory foil was obtained.

The ahesion was tested by the "Gitterschnitt" method according to DIN 53 151. The lacquer coating according to Examples 1 and 2 had ratings of GtO; on bending of the lacquered polyamide foils no cracks or peeling resulted.

The permeability to water of laminated safety and laminated bullet-proof glasses produced by bonding a lacquered amorphous polyamide foil to glass using plasticized polyvinyl butyral in accordance with the invention was tested by the boiling test as usually used with laminated glass. In this test, according to DIN 52 304 laminated glass is kept in boiling water for two hours so as to ascertain to what extent blisters form in the laminated glass. Laminates with the polyamides turned milky-cloudy after 20 minutes and after 2 hours completely opaque when no protective coatings were applied. On the other hand, by applying lacquer coatings on all sides according to Examples 1 and 2 the testpieces after the boiling test remained clear and transparent.

The scratch resistance was determined by the "Schaufelrad-Sand-Methode" (paddle wheel and sand method) and subsequent measurement of the degree of clouding according to DIN 53 490. In this method, a rotating paddle wheel periodically throws blasting sand (grain size 200 microns, main portion 60–120 microns) against the piece to be tested. After 6-hours the degree of clouding of the exposed plates is determined and compared with that for untreated pieces. The results are as follows:

TABLE

| Amorphous Polyamide | Cloudiness 0/00 | | |
|---|---|---|---|
| | Prior to Sand Test | After Sand Test | Difference |
| unvarnished | 16 | 39 | 23 |
| varnished according to Example 1 | 6.5 | 9 | 2.5 |
| varnished according to Example 2 | 7 | 9 | 2 |

EXAMPLE 3 a. In a reaction vessel equipped with stirrer and cooler, 685 g of ethylene glycol was heated to 120°C while introducing nitrogen. Thereupon 934 g of adipic acid were added incrementally while stirring. After closing the vessel, the temperature was increased to 150°C and maintained at that level for about 8 hours. Thereupon the temperature was raised to about 170°C over a period of 2 to 3 hours. It was maintained at that level until the acid number had dropped to approximately 6. Thereupon the distillation was continued while slowly increasing the vacuum until an acid number of 1 was reached. The polyester produced had an OH-number of 280, its OH-equivalent weight was thus 200, i.e. the OH content was 8.5% by weight.

b. There are heated for about 3 hours at 75°–80°C in a reaction vessel equipped with reflux condenser and stirrer, while introducing a dry inert gas, the following mixture:

| | |
|---|---|
| polyester of (a) | 400 g |
| mixed 2,4,4- and 2,2,4-trimethylhexamethylene-diisocyanate | 189 g |
| cyclohexanone | 196 g |

There results a pre-adduct solution having a solids content of 75% by weight; the solution has an OH-equivalent weight of 3.925, the solid resin thus having an equivalent weight of 2.945.

From 157 g of the 75% solution of said pre-adduct and 8 g of trifunctional hexamethylenediisocyanate biuret a lacquer is prepared which sets to a relatively soft coating in 30 minutes at 120°C when applied to a polyamide sheet in a thickness of 0.1 mm.

It will be appreciated that the instant specification and examples are set forth by way of illustration and not limitation and that various modifications and changes may be made without departing from the spirit and scope of the present invention.

What is claimed is:

1. In the production of a safety laminate wherein a transparent sheet is bonded to an amorphous polyamide sheet, the improvement which comprises covering the polyamide sheet with a lacquer comprising a polymer selected from the group consisting of an addition product of an isocyanate with a compound containing labile hydrogen atoms, and a polyfunctional hydroxyl group-containing acrylate resin cross-linked with malamine resins or polyisocyanates, and pressing the lacquer-coated polyamide sheet between surfaces of the highest optical quality to impart thereto a surface of the highest optical quality prior to bonding said polyamide sheet to said transparent sheet.

2. Process according to claim 1 wherein said lacquer comprises an addition product of an isocyanate with a hydroxy-containing polyester.

3. Process according to claim 1, wherein said resin comprises a hydroxyl group-containing acrylate resin cross-linked with a melamine resin or polyisocyanate.

4. Process according to claim 1, wherein said polyamide shut is bonded to said transparent sheet by plasticized polyvinyl butyral, and the resulting laminate is pressed between plane surfaces to form an optically acceptable product.

5. Process according to claim 1, wherein said lacquer is set by heat treatment.

6. A safety laminate produced by the process of claim 1.

* * * * *

UNITED STATES PATENT OFFICE
CERTIFICATE OF CORRECTION

PATENT NO. : 3,916,074
DATED : October 28, 1975
INVENTOR(S) : Wilhelm Knackstedt et al It is certified that error appears in the above-identified patent and that said Letters Patent are hereby corrected as shown below:

Column 2, line 56, correct spelling of "Vieweg".

Claim 1, column 6, line 31, correct spelling of "melamine".

Claim 4, column 6, line 44, cancel "shut is bonded to said transparent sheet" and substitute -- sheet is bonded to said transparent sheet ---.

Signed and Sealed this

Twenty-fourth Day of August 1976

(SEAL)

Attest:

RUTH C. MASON
Attesting Officer

C. MARSHALL DANN
Commissioner of Patents and Trademarks